US012778085B2

(12) United States Patent
Cusack

(10) Patent No.: US 12,778,085 B2
(45) Date of Patent: Nov. 3, 2026

(54) MULTI-PET LEASH

(71) Applicant: Timothy Reven Everette Cusack, Wilmington, DE (US)

(72) Inventor: Timothy Reven Everette Cusack, Wilmington, DE (US)

( * ) Notice: Subject to any disclaimer, the term of this patent is extended or adjusted under 35 U.S.C. 154(b) by 11 days.

(21) Appl. No.: 17/812,250

(22) Filed: Jul. 13, 2022

(65) Prior Publication Data

US 2023/0055110 A1 Feb. 23, 2023

Related U.S. Application Data

(60) Provisional application No. 63/260,417, filed on Aug. 19, 2021.

(51) Int. Cl.
*A01K 27/00* (2006.01)

(52) U.S. Cl.
CPC .......... *A01K 27/005* (2013.01); *A01K 27/003* (2013.01)

(58) Field of Classification Search
CPC ............................ A01K 27/005; A01K 27/003
USPC ........................ 24/712, 115 R; 119/497, 712
See application file for complete search history.

(56) References Cited

U.S. PATENT DOCUMENTS 161,757 A * 4/1875 Covert .................... F16G 11/00 24/135 N
225,958 A * 3/1880 Weber ..................... F16G 11/00 24/115 J
236,557 A * 1/1881 Covert .................... F16G 11/00 24/135 N
426,731 A * 4/1890 Metzler ................... F16G 11/06 279/43.3
430,043 A * 6/1890 Seiders ................... F16G 11/00 24/135 R
468,537 A * 2/1892 Porter ..................... F16G 11/00 24/115 R
981,676 A * 1/1911 Oppenheim .............. A41F 3/02 2/307
3,115,727 A * 12/1963 Middendorf .............. E04C 5/12 52/223.13

(Continued)

FOREIGN PATENT DOCUMENTS

CN 109548686 A * 4/2019
DE 202012000682 U1 * 5/2012 ........... A01K 27/003
JP 6667923 B1 * 3/2020

*Primary Examiner* — David J Parsley
*Assistant Examiner* — Angelica Alejandra Almeida Bonnin
(74) *Attorney, Agent, or Firm* — Dunlap Bennett & Ludwig PLLC

(57) ABSTRACT

An apparatus and method for avoiding the entanglement of a pet leash when restraining multiple pets under leashed conditions is disclosed. The multi-pet leash includes a multi-terminal direct connect line assembly that is operatively coupled to a primary leash lead. The multi-terminal lead is coupled to the primary leash lead through a self-adjusting plexi-slider attached to a distal end of the primary leash lead. A coupling is provided at opposed ends of the multi-terminal lead for attachment to a collar or harness of the pet. The multi-terminal lead is slidably received through the self-adjusting plexi-slider such that each pet retained on opposed ends of the multi-terminal lead are cooperatively joined with the primary leash lead. The cooperative joining of the pets provides an interconnected awareness of the other pet allowing the pets to learn to avoid leash entanglements.

20 Claims, 3 Drawing Sheets

(56) References Cited

U.S. PATENT DOCUMENTS

| | | | | | |
|---|---|---|---|---|---|
| 3,253,340 | A * | 5/1966 | Farnam | G01B 3/40 | 269/254 R |
| 3,319,990 | A * | 5/1967 | Beal | F16G 11/00 | 24/129 R |
| 3,409,950 | A * | 11/1968 | Boyd | F16G 11/10 | 188/196 P |
| 3,518,791 | A * | 7/1970 | Carson | A01G 17/08 | 248/339 |
| 3,602,956 | A * | 9/1971 | Eddens | H02G 7/053 | 248/63 |
| 3,614,098 | A * | 10/1971 | Carr | A63B 21/018 | 24/115 R |
| 3,844,601 | A * | 10/1974 | Rochester, Jr. | B66C 1/12 | 24/114.5 |
| 4,118,059 | A * | 10/1978 | Lindsay | B66C 1/12 | 24/115 R |
| 4,334,413 | A * | 6/1982 | Gaston | A44C 5/22 | 63/3.2 |
| 4,479,785 | A * | 10/1984 | Tugwood | B63B 32/73 | 441/75 |
| 4,667,625 | A * | 5/1987 | Malone | A01K 27/005 | 119/785 |
| 4,719,671 | A * | 1/1988 | Ito | B23K 35/004 | 24/115 M |
| 5,161,486 | A * | 11/1992 | Brown | A01K 27/00 | 119/776 |
| 5,462,019 | A * | 10/1995 | Hong-Rong | A01K 1/04 | D30/153 |
| 5,632,234 | A * | 5/1997 | Parker | A01K 27/003 | 119/795 |
| 5,701,848 | A * | 12/1997 | Tozawa | A01K 27/003 | 119/797 |
| 5,724,921 | A * | 3/1998 | Bell | A01K 27/003 | 119/795 |
| 5,926,996 | A * | 7/1999 | Frazier | A01K 91/18 | 43/44.84 |
| 6,170,130 | B1 * | 1/2001 | Hamilton | A45F 3/04 | 24/130 |
| 6,237,539 | B1 * | 5/2001 | Sporn | A01K 27/003 | 119/771 |
| 6,247,428 | B1 * | 6/2001 | Mireles | A01K 27/003 | 119/771 |
| 7,096,827 | B2 * | 8/2006 | Sporn | A01K 27/005 | 119/793 |
| 7,114,467 | B2 * | 10/2006 | Jones | A01K 27/003 | 119/795 |
| 7,467,604 | B1 * | 12/2008 | Werner | A01K 27/005 | 119/770 |
| D615,253 | S * | 5/2010 | Goodell | D30/153 | |
| 8,327,808 | B2 * | 12/2012 | Chirico | A01K 27/003 | 119/792 |
| 8,863,698 | B2 * | 10/2014 | Romiluyi | A01K 27/003 | 119/796 |
| D725,843 | S * | 3/2015 | Schott, Jr. | D30/153 | |
| 9,363,982 | B2 * | 6/2016 | Fleming | A01K 27/003 | |
| 9,392,769 | B2 * | 7/2016 | Van Bemmelen | A01K 27/003 | |
| 9,975,743 | B2 * | 5/2018 | Barnet | B66D 3/04 | |
| 10,070,625 | B2 * | 9/2018 | Shi | A01K 27/003 | |
| 10,420,326 | B1 * | 9/2019 | Rand | A01K 27/005 | |
| 10,499,615 | B2 * | 12/2019 | O'Connell | A01K 27/005 | |
| 10,532,918 | B2 * | 1/2020 | Hannan | B66D 3/04 | |
| 11,141,621 | B2 * | 10/2021 | Kushner | A63B 21/4043 | |
| 2006/0150923 | A1 * | 7/2006 | Jones | A01K 27/003 | 119/795 |
| 2007/0215065 | A1 * | 9/2007 | Furlich | A01K 27/003 | 119/795 |
| 2008/0134989 | A1 * | 6/2008 | Weiss | A01K 27/003 | 119/793 |
| 2008/0256760 | A1 * | 10/2008 | Kavanaugh | A01K 91/03 | 24/115 R |
| 2009/0120376 | A1 * | 5/2009 | Foster | A01K 27/003 | 119/795 |
| 2014/0007818 | A1 * | 1/2014 | Cheng | A01K 27/005 | 119/795 |
| 2015/0090196 | A1 * | 4/2015 | Fleming | A01K 27/003 | 119/795 |
| 2017/0164584 | A1 * | 6/2017 | Manssourian | A01K 27/002 | |
| 2020/0053985 | A1 * | 2/2020 | Tang | A01K 27/005 | |
| 2021/0274753 | A1 * | 9/2021 | Altman | A01K 27/005 | |

* cited by examiner

MULTI-PET LEASH

CROSS-REFERENCE TO RELATED APPLICATION

This application claims the benefit of priority of U.S. provisional application No. 63/260,417, filed Aug. 19, 2021, the contents of which are herein incorporated by reference.

BACKGROUND OF THE INVENTION

The present invention relates to leashes for pets, and more particularly, to leashes for multiple pets.

For pet owners with multiple pets, maintaining control of the pets when on a walk or in other situations requiring that their pets be retained under leash, presents difficulties. For some owners, each pet is retained on their own leash. In other cases, multi-pet leashes known in the art are utilized. However, in each circumstance, it can be difficult for the pet owner to avoid entanglement of the pets' leashes as their pets engage in their normal activities because the configurations of the leashes give the pets the impression that they are independently retained, without an awareness of their pet mates. The pets do not typically learn to avoid entanglements with their pet mates and the pet owner is left with the frustration of having to repeatedly untangle the leashes.

This condition is exacerbated by obstacles such as trees, street signposts, and the like along a walking route. One pet may go to the left of an obstacle while the other may go to the right of the obstacle. In this circumstance, while the leashes may not become entangled with each other, one or the other may become entangled with the obstacle.

As can be seen, there is a need for an improved multi-pet leash to avoid entanglements. The leash of the present invention, colloquially known as the "Together Dog" Leash, includes a direct connect feature that quickly makes the pair of dogs realize they are connected together, at the same time quickly learning they need to go the same way in order to keep moving forward. It becomes almost second nature and greatly advantages the owner. The way it works in simple terms is a user has two pets directly connected together, and the way they are controlled by that connection without any slack is to simply let the dogs go where they desire while maintaining steady pressure on a self-adjusting ring with any lead/leash or retractable leash. This keeps the entire system slack free, from which tangles in the leash typically are derived from.

SUMMARY OF THE INVENTION

In one aspect of the present invention, a multi-pet leash includes: a primary leash lead configured to be held by a user; a slider comprising a first side and a second side, with the first side of the slider coupled to the primary leash lead; a multi-terminal direct connect line assembly comprising a first side and a second side, the multi-terminal direct connect line assembly slidably coupled to the second side of the slider; a first coupling coupled to the first side of the multi-terminal direct connect line assembly, the first coupling being configured to connect to a first animal collar or harness; and a second coupling coupled to the second side of the multi-terminal direct connect line assembly, the second coupling being configured to connect to a second animal collar or harness.

In another aspect of the present invention, a method of avoiding leash entanglement while restraining two animals is disclosed, the method including the steps of: providing the above-described multi-pet leash; connecting the first coupling to a first animal collar or harness; and connecting the second coupling to a second animal collar or harness.

These and other features, aspects and advantages of the present invention will become better understood with reference to the following drawings, description, and claims.

BRIEF DESCRIPTION OF THE DRAWINGS

The following figures are included to illustrate certain aspects of the present disclosure and should not be viewed as exclusive embodiments. The subject matter disclosed is capable of considerable modifications, alterations, combinations, and equivalents in form and function, without departing from the scope of this disclosure.

DETAILED DESCRIPTION OF THE INVENTION

Figure 1:
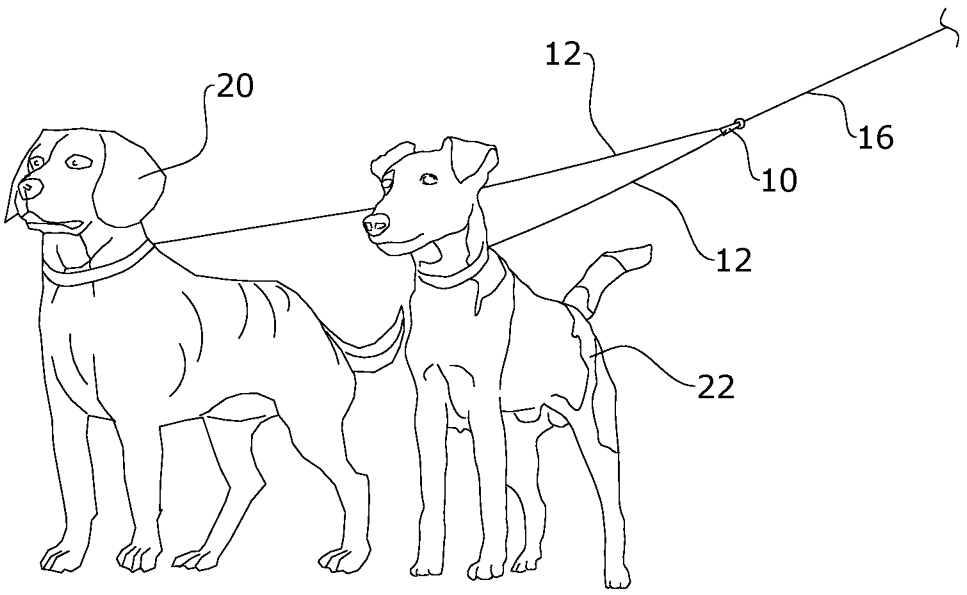
FIG. 1 is a perspective view of an embodiment of the present invention, in use.

The subject disclosure is described with reference to the drawings, wherein like reference numerals are used to refer to like elements throughout. In the following description, for purposes of explanation, numerous specific details are set forth in order to provide a thorough understanding of the present disclosure such that one skilled in the art will be enabled to make and use the present invention. It may be evident, however, that the present disclosure may be practiced without some of these specific details. For the purpose of clarity, technical material that is known in the technical fields related to the present invention has not been described in detail so that the present invention is not unnecessarily obscured.

Broadly, embodiments of the present invention provide an apparatus and method for avoiding the entanglement of a pet leash when restraining multiple pets under leashed conditions.

As seen in reference to the drawings of FIGS. 1-6, the multi-pet leash includes a multi-terminal direct connect line assembly 12 that is operatively coupled to a primary leash lead 16 (that includes, for example, a primary leash coupling 18). The multi-terminal direct connect line 12 is coupled to the primary leash lead 16 through a self-adjusting plexi-slider 10 with attachment point. The slider 10 described herein is formed from polycarbonate and is the attachment point that controls sliding of the direct connect line 12 relative to the primary leash lead 12 (described in greater detail below). Accordingly, it is noted that this plexi-slider is also referred to herein as a control slider 10, and specifically a polycarbonate control slider 10.

Figure 2:
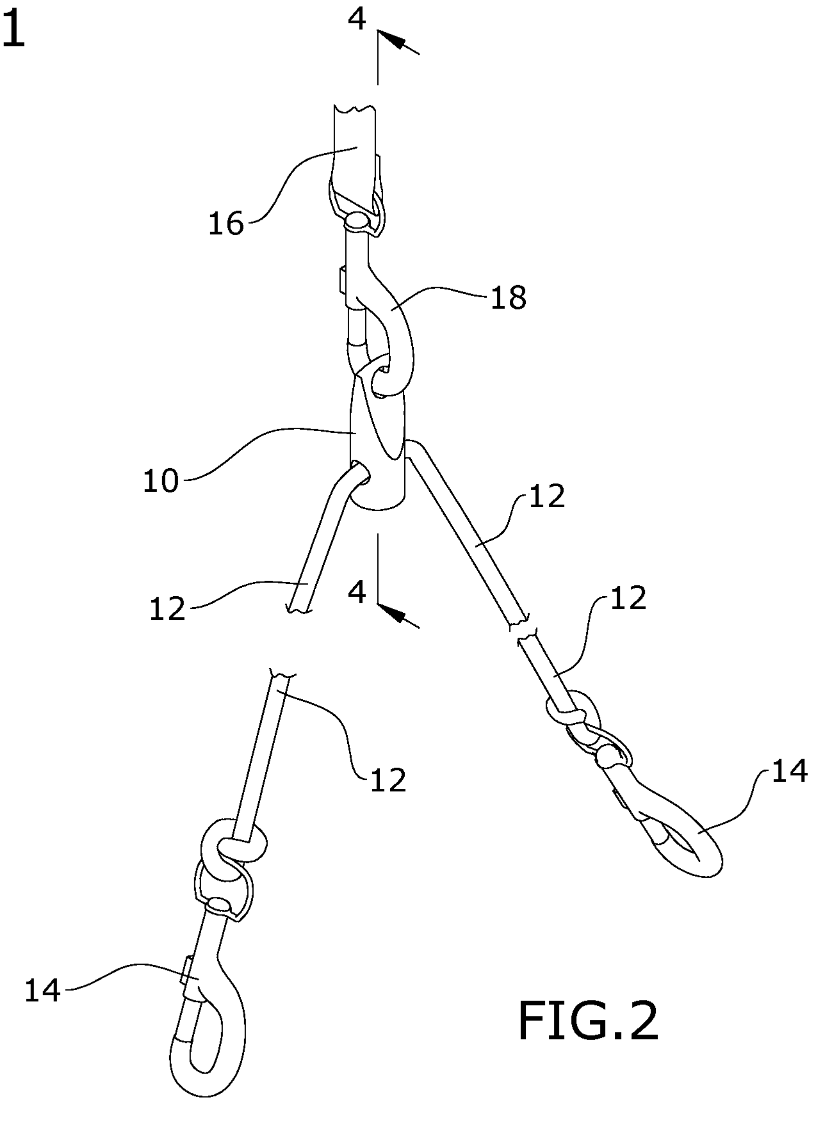
FIG. 2 is a perspective view of the embodiment of the present invention.
Figure 3:
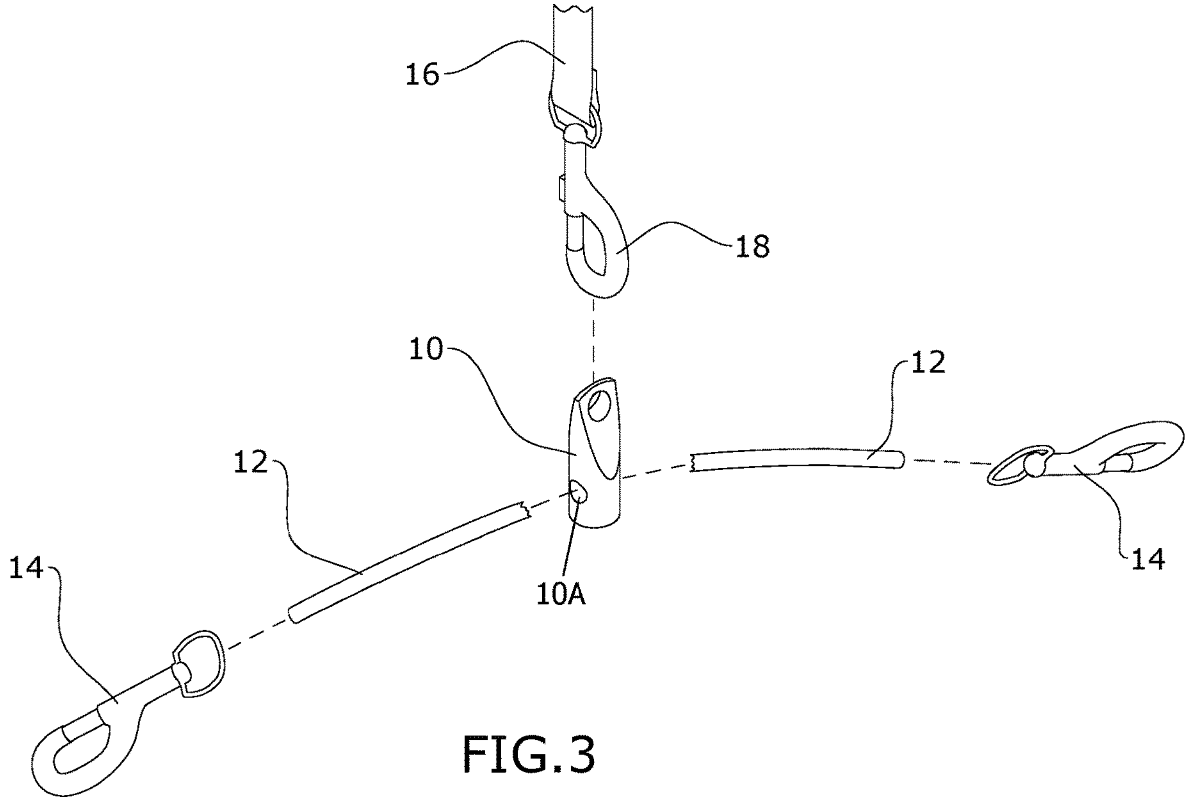
FIG. 3 is an exploded view of the embodiment of the present invention.
Figure 4:
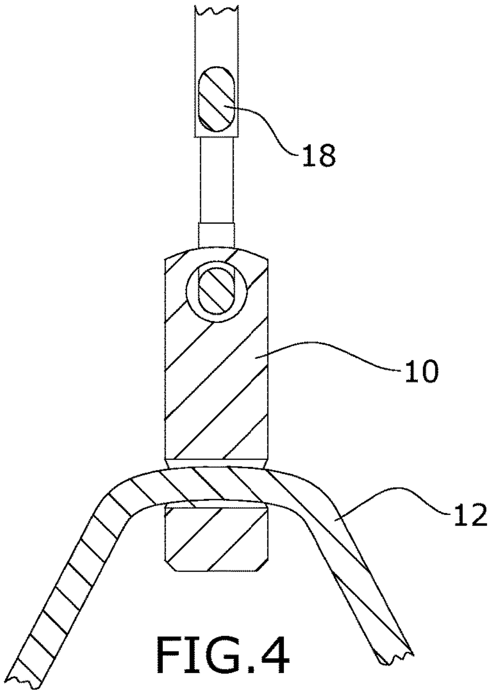
FIG. 4 is a section view of the embodiment of the present invention, taken along line 4-4 in FIG. 2.
Figure 5:
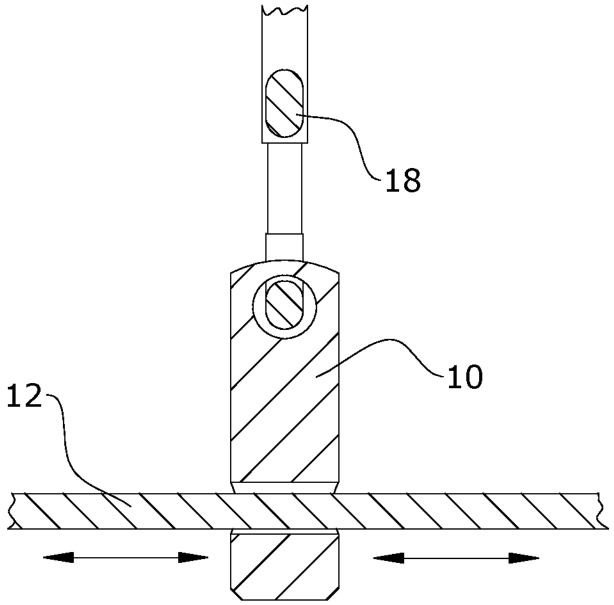
FIG. 5 is a section view of the embodiment of the present invention, showing the tether sliding.
Figure 6:
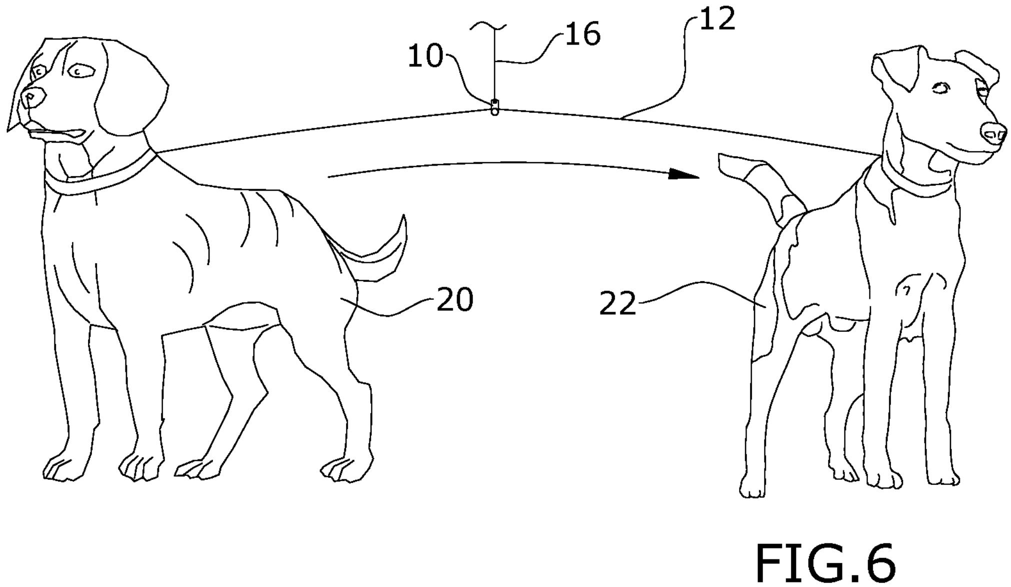
FIG. 6 is a perspective view of the embodiment of the present invention, showing the force of one dog transferring to the other.

As shown in FIG. 2, the plexi-slider 10 connects with the primary leash coupling 18 such that its position is largely fixed relative thereto (besides being allowed to rotates and slide a minor amount along the coupling 18). First and second couplings 14 are provided on opposed ends of the multi-terminal direct connect line assembly 12. The coupling 14 may be any suitable snap link or conventional leash lead attachment that couples with a corresponding ring on a collar or harness worn by the pet 20, 22. The primary leash lead 16 may include a loop or other handle for the pet owner to hold or secure the multi-pet leash. These components may be formed from any appropriate material (e.g., conventional leash materials and attachment point 10 being a molded plastic).

The multi-terminal direct connect line assembly 12 is slidably received through a laterally defined opening 10A in the self-adjusting plexi-slider with attachment point 10 such that each pet 20, 22 is retained on opposed ends of the multi-terminal direct connect line assembly 12 are cooperatively joined with the primary leash lead 16. The cooperative joining of the pets 20, 22 provides an interconnected awareness of the other pet 20, 22. Should a first pet 20 move in a certain direction, the second pet 22 will be aware of that movement by a tension applied to the opposite end to which they are attached via the coupling 14. The second pet 22 would either be encouraged to follow the same path as the first pet 20 or would overpower the first pet 20, which would then be drawn in that same direction as the second pet 22.

In the case of dogs, instinctive behaviors establish a dominance order, such that the dogs will learn to lead, follow, or be directed by the other dogs. By cooperatively joining the pets 20, 22, entanglements of the multi-terminal lead are avoided and once dominance is established, the pets 20, 22 even learn to recognize and avoid entanglements with obstacles.

Another feature of the "Together Dog" leash is herein referred as "Together Dog Self-Walk". Simply use the main "direct connect" 12 part of the leash by itself without any type of lead 16 attached, in private areas of the walk where you do not have to worry about being "Off-Leash" but you don't want two dogs running wild in opposite directions. Simply direct connect them together and let them do their thing (e.g., run around the area). The weight of the slider 10 by itself (unattached to any lead 16), helps draw the direct connect line 12 away from their feet while walking. By way of example, the inventor's dogs quickly learned how to keep the connection line 12 spread out to help prevent tangles on their own.

This feature is also referred to by the inventor as "always your best dog". What this means as an owner is, while both pets are "connected together" the owner always gets their "Best Dog". It is observable that the dog that likes to stay out of trouble the most will keep the other pet from doing something he or she shouldn't do. For example, one dog may like to chase deer, and another better-behaved dog does not, with the better-behaved dog holding back the one inclined to chase deer from being able to do so.

An even better feature of the "self-walk" Feature is while on these walks, an owner can keep moving ahead on their walk, while the "Together Dogs" can go at their own pace, stopping all the time to smell various things or relieve themselves, and they always catch up. Even better is when the owner comes upon another person and needs to get a hold of the dogs coupled to one another, they can simply just grab the "direct connect" line 12 and they instantly have both dogs under your control again.

Users of the Present Invention can Expect the Following from the "Together Dog" Leash:

The "Together Dog" Leash is primarily designed to work with a standard over the shoulder Dog Harness, with the attachment point being located on the dogs back or between their shoulder Blades. A turn around harness, with the attachment under the pet's neck, will not work as well with the "Together Dog" design. The good news is using the "Together Dog" Leash set-up actually makes it so you will not have to worry as much about a pet pulling on you while on the walk, as it is designed to put that unwanted "pull" on to the 2$^{nd}$ dog connected to the set-up, and it works quite well too.

As multiple-dog owners know, it can be overwhelming having 2 different dogs attached to one person. But a blessing when it works right. If you maintain a steady but light constant pressure to keep the "lead leash" and "direct connect" line off the ground and above the dog's neck, owners and other users will be amazed at how well this simple but well thought out design works.

The "Together Dog" leash set-up is a simple design that does not rely on a pully or special backup resistor apparatuses to prevent the line from extending all the way to one side when one dog decides it wants to be more dominant at the time. An owner can simply let the dogs go and let the "together dog" set up do its job. The owner and their pets will quickly see how easy the "Together dog" set-up makes walking two pets at once simple to maintain.

Even if, let's say one dog sees a squirrel and runs for it and the other dog simply just doesn't care to give chase, with a standard 4-foot lead attached to the "Direct Connect" line at the time, the more dominant dog will pull the "Direct connect" line all the way to one side as they are stopped to resist chase. When other designers panicked and overdesigned to prevent this, the present inventor decided to just let it happen. The result is more conducive to a better situation then one would expect. All it does is put the dominant dog out at a normal distance of about 10' feet and it puts the less dominant dog right in front of owner. The blessing of this is now you only have one dog over at the distraction instead of two, which works out well.

Let's say the situation warrants the owner pulling them in tight, as needed, to get hold of both dogs up close to grab the handle normally located on the dog's back on almost all your modern dog harnesses. The "Together dog" set up has this situation covered. Let's say the owner is walking with a 4-foot lead attached to the "Direct connect" line assembly and they need to get both pets up close to them quickly. With -in arms- length of the lead is the "Direct connect" line. So basically, with lead in one hand, they spread their arm and reach out and grab up the "Direct Connect" line, simply slide their hand about out to the middle of the line and pull close, which folds the line in half and with that just one hand over hand move, and one pull to fold in half move, they have their pets up close to them rather quickly.

There are many benefits to using polycarbonate as the material of the control slider 10. First, the weight, having a piece made from this material as opposed to metal. It is much lighter and less likely to cause accidental injury to the dogs or owner if it somehow becomes a swinging projectile during self-walk or even being carried while not in use. It also prevents the self-walk configuration from scratching floors as well. Second, the material results in a more efficient weight and creates an ideal amount of drag and control for self walk as it is intended to drag on the ground during self walk. This makes it much safer in the event the slider 10 strikes anything along the way and its shape helps it from getting stuck or jammed up along the way. Third, the use of polycarbonate in the design also keeps the slider 10 cool to get touch. With rope and intentional friction within the design, a metal piece could become quite hot and even may burn the operator if touched during use somehow. For instance, a user's hand or leg could easily come in contact with this piece during use. Fourth, the hole in the control slider 10 that has the direct connect lead passing through it has an elongated surface area that comes in contact with the sliding rope under tension. Take, for example, the utilization of a metal ring to provide the same intended functionality, where the metal ring would be about ⅛th inch thick. The metal ring would cause the rope to kink under tension, causing a lot more friction as the rope passes through the ring. Conversely, the present invention's elongated design and cooling properties of the material used has the direct connect rope passing through it with obvious ease and clearly less friction while under operating tension. This is also easily visualized during normal operation as the control slider moves with ease as it does its job almost effortlessly and quite effectively.

While one or more preferred embodiments are disclosed, many other implementations will occur to one of ordinary skill in the art and are all within the scope of the invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also considered to be within the scope of the present invention, which is not to be limited except by the claims that follow.

While apparatuses and methods are described in terms of "comprising," "containing," or "including" various components or steps, the apparatuses and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted. Moreover, the use of directional terms such as above, below, upper, lower, upward, downward, left, right, and the like are used in relation to the illustrative embodiments as they are depicted in the figures, the upward or upper direction being toward the top of the corresponding figure and the downward or lower direction being toward the bottom of the corresponding figure.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A multi-pet leash for cooperatively joining two dogs under leashed conditions to teach the two dogs an interconnected awareness through enabling one dog to draw the other dog in the same direction, the multi-pet leash comprising:

a primary leash lead configured to be held by a user;

a slider comprising a solid body having a first connection channel positioned adjacent to a first end and a second connection channel positioned adjacent to a second end, wherein the second connection channel extends only linearly, wherein the second connection channel has a length defined by a first end and an opposing second end, wherein the first and second ends are located at diametrically opposing surfaces of an outer surface of the solid body, and wherein the second connection channel has a uniform uninterrupted circular cross section from the first end to the second end, and wherein:

a first direction of the first connection channel is approximately perpendicular to a second direction of the second connection channel, the first direction of the first connection channel is fixed relative to the second direction of the second connection channel, and the primary leash lead is coupled to the first connection channel, wherein the slider does not have a pulley for interconnecting the two dogs so that one dog is enabled to draw the other dog in the same direction;

a multi-terminal direct connect line assembly comprising a connect line having a first line end and a second line end, wherein the multi-terminal direct connect line assembly is slidably coupled through the second connection channel of the slider, wherein:

the connect line has a diameter that allows the connect line to slide within the second connection channel from the first line end to the second line end;

a first coupling coupled to the first line end of the multi-terminal direct connect line assembly, the first coupling being configured to connect to a first animal collar or harness; and a second coupling coupled to the second line end of the multi-terminal direct connect line assembly, the second coupling being configured to connect to a second animal collar or harness of a second dog of the two dogs in a leashed condition, whereby the two dogs under leashed conditions are linearly interconnected via the linear second connection channel so that one dog is enabled to draw the other dog in the same direction.

2. The multi-pet leash of claim 1, wherein the slider is formed from polycarbonate.

3. The multi-pet leash of claim 1, wherein the connect line slides within the second connection channel to abut the first coupling and the second coupling.

4. The multi-pet leash of claim 1, wherein the primary leash lead comprises a primary leash coupling, with the slider being directly coupled to the primary leash coupling.

5. A method for cooperatively joining two dogs under leashed conditions to teach the two dogs an interconnected awareness, the method comprising the steps of:

providing the multi-pet leash of claim 1;

connecting the first coupling to the first animal collar or harness of a first dog of the two dogs;

connecting the second coupling to the second animal collar or harness of a second dog of the two dogs; and maintaining a constant pressure to keep the primary leash lead and the slider off the ground and above the two dog's necks so that the connect line extends only linearly through the second connection channel whereby one dog of the two dogs is enabled to draw the other dog of the two dogs in the same direction so as to teach the interconnected awareness.

6. The method of claim 5, wherein the slider is formed from polycarbonate.

7. The method of claim 5, wherein the connect line slides within the second connection channel to abut the first coupling and the second coupling.

8. The method of claim 5, wherein the primary leash lead comprises a primary leash coupling, with the slider being directly coupled to the primary leash coupling.

9. The multi-pet leash of claim 1, wherein the multi-terminal direct connect line is unobstructed, thereby allowing the multi-terminal direct connect line to slide within the second connection channel to abut the first coupling and the second coupling.

10. The multi-pet leash of claim 3, wherein the solid body of the slider has only two connection channels: said first and second connection channels.

11. A multi-pet leash comprising:

a primary leash lead configured to be held by a user;

a slider comprising a uniformly solid body having only two openings: a first connection channel positioned adjacent to a first end and a second connection channel positioned adjacent to a second end, wherein the second connection channel extends only linearly, wherein the second connection channel has a length defined by a first end and an opposing second end, wherein the first and second ends are located at diametrically opposing surfaces of an outer surface of the solid body, and wherein the second connection channel has a uniform uninterrupted circular cross section from the first end to the second end to minimize friction with a line extending through the second connection channel, and wherein:

a first direction of the first connection channel is approximately perpendicular to a second direction of the second connection channel, the first direction of the first connection channel is fixed relative to the second direction of the second connection channel, the first end is tapered so that a first distance of the first connection channel is substantially less than a second distance of the second connection channel, and the primary leash lead is coupled to the first connection channel a multi-terminal direct connect line assembly comprising a connect line having a first line end and a second line end, wherein the multi-terminal direct connect line assembly is slidably coupled through the second connection channel of the slider, wherein:

the connect line has a diameter that allows the connect line to slide within the second connection channel from the first line end to the second line end;

a first coupling coupled to the first line end of the multi-terminal direct connect line assembly, the first coupling being configured to connect to a first animal collar or harness; and a second coupling coupled to the second line end of the multi-terminal direct connect line assembly, the second coupling being configured to connect to a second animal collar or harness, wherein the solid body between the first connection channel and the second connection channel is continuous and uniform in cross section so as to stop the first coupling and the second coupling.

12. The multi-pet leash of claim 11, wherein the slider does not have a pulley.

13. The multi-pet leash of claim 11, wherein the slider is formed from polycarbonate.

14. The multi-pet leash of claim 11, wherein the connect line slides within the second connection channel to abut the first coupling and the second coupling.

15. The multi-pet leash of claim 11, wherein the primary leash lead comprises a primary leash coupling, with the slider being directly coupled to the primary leash coupling.

16. The multi-pet leash of claim 11, wherein the second connection channel forms an elongated cylindrical opening.

17. The multi-pet leash of claim 11, wherein the first connection channel is proximal the primary leash lead relative to the second connection channel.

18. The multi-pet leash of claim 11, wherein the second connection channel is not a ring.

19. A method of avoiding leash entanglement while restraining two animals, the method comprising the steps of:

providing the multi-pet leash of claim 11;

connecting the first coupling to a first animal collar or harness; and connecting the second coupling to a second animal collar or harness.

20. The method of claim 19, wherein the slider is formed from polycarbonate.

* * * * *